TRANSFER COATING FOR CARBON PAPER AND THE LIKE

Warren H. Woerner, Rochester, N.Y., assignor to Kee Lox Manufacturing Company, Rochester, N.Y.
No Drawing. Filed Nov. 1, 1971, Ser. No. 194,750
Int. Cl. C09d 3/14, 3/16
U.S. Cl. 260—17 R                6 Claims

ABSTRACT OF THE DISCLOSURE

There are disclosed formulations for coatings for carbon papers comprising a plastic binder, ink, and a solvent. The plastic binder is composed of a methyl methacrylate polymer, a modifying resin, and a plasticizer. The methyl methacrylate comprises between 51% and 90% of the total resin content. The ink is composed of oils, coloring materials, a surface active agent, and a filler or extender. The modifying resin is compatible with the acrylic resin and the plasticizer but incompatible with the oils used in the ink.

---

The present invention relates to ink-transfer compositions, and more particularly to formulations used in the production of so-called "carbon" papers for use in typewriters and other duplicating media. In a more specific aspect, the invention relates to a transfer medium consisting basically of a resinous coating having uniformly dispersed in it an ink composed of an oil that is non-compatible with the coating and which contains a quantity of coloring material. Under pressure the ink is squeezed from the coating to make an image on the copy sheet.

Previous compositions of this type have been on the market and have enjoyed considerable success. However, they have certain disadvantages, among which are:

(1) The images made tend to have somewhat fuzzy outlines, caused primarily by droplets of ink being released from the coating under impact of typewriter keys, for instance.

(2) The images made tend to have blurred, grayish, rather than black color.

(3) The coatings tend to harden on exposure to atmosphere or to elevated temperatures, resulting in weaker images and limited shelf life.

(4) The coatings tend to have a layer of oil on their surfaces, resulting in soiling of the hands upon handling.

(5) The carbon papers tend to curl, especially at high or low humidities.

A primary object of this invention is to provide a carbon paper which will produce a sharp, well-defined image with little or no trace of fuzzy characters.

Another object of the invention is to provide a carbon paper with improved shelf life.

A further object of the invention is to provide a carbon paper which is cleaner when handled.

Still another object of the invention is to provide a carbon paper which has less tendency to curl at high or low humidities.

Other objects of the invention will be apparent hereinafter from the specification and from the recital of the appended claims.

A coating made according to the present invention consists of three parts: the plastic binder, the ink which forms the actual image, and the solvent system. The latter serves to dissolve and suspend the solid components of the formula and to reduce the viscosity of the mixture to a value suitable for coating.

The plastic binder is composed primarily of a low molecular weight acrylic resin such as methyl methacrylate polymer, together with a modifying cellulose ester resin, and a plasticizer. The methyl methacrylate comprises at least 51% of the total resin content, and may comprise up to 90%. The modifying cellulose ester serves to reduce brittleness and increase the toughness and resistance to impact of the coating. It should be compatible with the acrylic resin and the plasticizer used and incompatible with the oils used in the ink.

Among the useful cellulose esters are cellulose acetate-butyrate and nitrocellulose, the preferred one being the cellulose acetate-butyrate resin known as ½ second butyrate.

The plasticizer comprises a liquid compatible with both resins and altering the physical properties of the resin blend. It serves to increase the flexibility of the binder to prevent the coating from cracking or chipping, and to help reduce curling tendencies. Suitable plasticizers include such compounds as dioctyl phthalate, dibutyl phthalate, dibutyl sebacate, dioctyl adipate, and many others.

The acrylic resin, which constitutes more than half of the total resin content, serves to furnish the sharp, black or other colored, well-defined image which is one of the chief improvements of this invention; and it also aids in promoting cleanliness.

The ink, which is the actual imaging material, is composed of oils, which are incompatible with the plastic binder, coloring materials, a surface active agent, and a filler or extender. Many oils are suitable for use, among them castor oil, various vegetable oils, such as corn, olive and peanut oils, and various mineral oils, particularly naphthenic mineral oils. It is important that the oils used be incompatible with the plastic binder, be non-volatile, and be non-drying. It has been found that the latter two properties contribute to good shelf life, and that one oil, which has all three desirable properties, and which is preferred, is peanut oil.

The coloring materials are composed of pigments, which are dispersed in the oils to give the desired color. Examples of useful pigments are carbon blacks, iron blues, and alkali blue. It has been found that the surface active agent is useful to reduce the viscosity of the ink, resulting in a lower formula viscosity for a given solids content. This results in a smoother coat and greater economy since higher solid content formulations may be used. Examples of suitable surface active agents are lecithin, certain basic dyes combined with oleic acid, and some aliphatic amines combined with long chain fatty acids.

A filler, or extender is incorporated in the ink to absorb some of the ink oils. This prevents the coating from having an oily or greasy surface, and also helps prevent blocking. Suitable fillers are various grades of clay, various grades of calcium carbonates, starches, dextrines, and many others.

An example of our new formulation is:

|  | Parts by wgt. |
|---|---|
| Low molecular weight methyl methacrylate polymer | 7.0 |
| Flexol A–26 di(2-ethylhexyl)adipate (Union Carbide) | 4.0 |
| ½ second butyrate (cellulose acetate butyrate) | 5.0 |
| Surface active agent | .5 |
| Alkali blue paste | 4.5 |
| Carbon black | 2.0 |
| Peanut oil | 7.0 |
| Dextrine | 6.5 |
| Methyl ethyl ketone | 38.5 |
| 2-nitropropane | 25.0 |
|  | 100.0 |

A second example of our formulation is:

| | Parts by wgt. |
|---|---|
| Low molecular wgt. methyl methacrylate polymer | 5.6 |
| Flexol A–26 (plasticizer) | 4.0 |
| RS nitrocellulose 30–35 c.p.s. | 5.4 |
| Surface active agent | .5 |
| Alkali blue paste | 4.5 |
| Carbon black | 2.0 |
| Peanut oil | 7.0 |
| Dextrine | 6.5 |
| Methyl ethyl ketone | 39.5 |
| 2-nitropropane | 25.0 |
| | 100.0 |

This formulation results in a somewhat harder coat and a sharper write than the first example.

While the invention has been described in connection with different embodiments thereof and uses therefor, it will be understood that it is capable of further modification and use, and this application is intended to cover any embodiments, modifications, or uses of the invention that come within the principles of the invention or the recital of the appended claims.

Having thus described my invention, what I claim is:

1. A transfer coating for carbon paper, consisting of a plastic binder composed of a homopolymethylmethacrylate resin, a cellulose ester resin selected from the group consisting of cellulose acetate-butyrate and nitrocellulose, and a liquid plasticizer,
the polymethylmethacrylate resin constituting 51% to 90% of the total resin content, and the cellulose resin constituting 49 to 10% of the total resin content,
an ink uniformly dispersed in the binder and containing a pigment and an oil carrier therefor, and a solvent,
said cellulose ester resin being compatible with the acrylate resin and incompatible with the oil used in the ink, and
said solvent serving to dissolve and suspend the solid components of the composition and to reduce the viscosity of the composition to a value suitable for forming a transfer coating,
said ink being expressable from the coating under pressure.

2. A transfer coating as claimed in claim 1, wherein the plasticizer is selected from the group consisting of dioctyl phthalate, dibutyl phthalate, dibutyl sebacate, and dioctyl adipate.

3. A transfer coating as claimed in claim 1, wherein the ink comprises an oil, a coloring material, a surface active agent, and a filler.

4. A transfer coating as claimed in claim 3, wherein the oil is selected from the group consisting of castor oil, corn, olive and peanut oils, and naphthenic mineral oils that are non-volatile and non-drying, and the filler is selected from the group consisting of clay, calcium carbonate and dextrine.

5. A transfer coating as claimed in claim 1, wherein the oil is peanut oil.

6. A transfer coating as claimed in claim 5, wherein the surface active agent is selected from the group consisting of lecithin, a basic dye combined with oleic acid, and an aliphatic amine combined with a long chain fatty acid.

References Cited
UNITED STATES PATENTS

| | | | |
|---|---|---|---|
| 2,139,008 | 12/1938 | Ensminger et al. | 260—17 R |
| 2,857,344 | 10/1958 | Walus et al. | 260—17 R |
| 3,283,036 | 11/1966 | Larson et al. | 260—17 R |
| 3,141,789 | 7/1964 | McConeghey | 260—17 R |
| 2,868,741 | 1/1959 | Chambers et al. | 260—17 R |
| 3,194,676 | 7/1965 | Krumbein et al. | 260—17 R |

WILLIAM H. SHORT, Primary Examiner

P. F. KULKOSKY, Assistant Examiner

U.S. Cl. X.R.

117—36.7